(12) United States Patent
Gage et al.

(10) Patent No.: US 7,050,234 B2
(45) Date of Patent: May 23, 2006

(54) LOSSLESS BEAM COMBINATION IN A DUAL FIBER COLLIMATOR USING A POLARIZING BEAMSPLITTER

(75) Inventors: Edward C. Gage, Apple Valley, MN (US); Ronald E. Gerber, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 105 days.

(21) Appl. No.: 10/137,840

(22) Filed: May 1, 2002

(65) Prior Publication Data

US 2003/0206349 A1    Nov. 6, 2003

(51) Int. Cl.
G02B 27/28 (2006.01)
G02B 5/30 (2006.01)

(52) U.S. Cl. .............. 359/495; 359/494; 359/496; 385/11; 385/24; 398/86

(58) Field of Classification Search .............. 359/31, 359/39, 40, 42, 246, 250, 256, 494–496, 359/487; 372/6; 353/31; 385/11, 24; 398/82, 398/86
See application file for complete search history.

(56) References Cited

U.S. PATENT DOCUMENTS

| | | | | |
|---|---|---|---|---|
| 4,911,547 A | * | 3/1990 | Ledebuhr ...................... | 353/31 |
| 5,381,250 A | * | 1/1995 | Meadows .................... | 349/196 |
| 5,841,797 A | * | 11/1998 | Ventrudo et al. .............. | 372/6 |
| 6,411,749 B1 | * | 6/2002 | Teng et al. ................... | 385/11 |
| 6,865,024 B1 | * | 3/2005 | Cao ........................... | 359/498 |

* cited by examiner

*Primary Examiner*—Leonidas Boutsikaris
(74) *Attorney, Agent, or Firm*—Carlson, Caspers, Vandenburgh & Lindquist

(57) ABSTRACT

A compact, in-line polarization combiner uses a folded, reflective optical path from a first fiber to a second fiber. The combiner includes first and second fibers at one end of an in-line package, and a third fiber at the other end of the in-line package. A first polarization-dependent optical path is defined between the first and second fibers for light in a first polarization state. A second polarization-dependent path is defined between the first and third fibers for light in a second polarization state orthogonal to the first polarization state. A polarizer is disposed between the ends of the combiner and reflects light on the first path between the first and second fibers and transmits light on the second path between the first and third ports, A reflector is disposed on the first path to reflect light to the polarizer.

16 Claims, 6 Drawing Sheets

LOSSLESS BEAM COMBINATION IN A DUAL FIBER COLLIMATOR USING A POLARIZING BEAMSPLITTER

FIELD OF THE INVENTION

The present invention is directed generally to a method and apparatus for combining light beams from different fibers, and more particularly to an in-line method and apparatus for polarization combining light beams.

BACKGROUND

Many optical fiber systems include one or more fiber amplifiers disposed along the fiber path between the transmitter and the receiver to boost the strength of the optical signal and overcome losses in the fiber system, such as fiber transmission losses, coupling losses and the like. Fiber amplifiers are energized by light from one or more pump lasers coupled into the fiber system. It is often desirable to combine the pump light of two or more pump lasers into a single fiber in order to increase the pump power reaching the fiber amplifier. Higher pump power results in higher amplifier gain, and thus reduces the number of amplifiers that need to be disposed along the fiber path. The amplifier noise may also be reduced. Different types of fiber amplifiers require pump lasers operating at different wavelengths. For example, an erbium fiber amplifier typically requires a pump laser operating at about 980 nm and a fiber Raman amplifier for amplifiying light at about 1550 nm requires a pump laser wavelength of about 1460 nm. In some situations, it is also desireable to combine pump lasers of different wavelengths. For example, when pumping a Raman amplifier, it may be useful to pump two or more different wavelengths in order to control the gain spectrum for the signal light.

Prior solutions to combining the output power from pump lasers have employed the use of a 50/50 splitter, which is lossy. Other solutions have included polarization combining the output from two lasers, which requires the use of a polarizer. However, there are problems with currently available optical configurations used for polarization combining. For example, Wollaston polarizing beamsplitters are expensive and difficult to align. On the other hand, thin film polarizers such as polarizing beamsplitter cubes operate with large angular separation between the p- and s-polarized beams, which makes operation in compact, in-line packages difficult.

Therefore, there is a need to develop a compact, in-line polarization combiner that is straightforward to align.

SUMMARY OF THE INVENTION

Generally, the present invention relates to a fiber optic polarization combiner, and relates in particular to an in-line polarization combiner that is compact and uses a folded, reflective optical path from a first fiber to a second fiber.

In one particular embodiment, the invention is directed to an optical device that includes first and second ports at a first end of an in-line package, and a third port at a second end of the in-line package opposite the first end. A first polarization-dependent optical path is defined between the first and second ports for light in a first polarization state and a second polarization-dependent path is defined between the first and third ports for light in a second polarization state orthogonal to the first polarization state.

In another embodiment, the invention is directed to a polarization combiner that includes first, second and third optical ports. A first optical path is defined between the first and second ports and a second optical path is defined between the first and third ports. A polarizer is disposed on an axis of the polarization combiner and reflects light on the first path between the first and second ports and transmits light on the second path between the first and third ports. A reflector is disposed between the polarizer and the second port to reflect light on the first path.

Another embodiment of the invention is directed to a method of combining optical beams. The method includes reflecting a first optical beam in a first polarization state from a first optical port to a polarizer using a reflector and reflecting the first optical beam from the polarizer to a second optical port. The method also includes transmitting a second optical beam in a second polarization state orthogonal to the first polarization state from a third optical port through the polarizer to the second optical port.

Another embodiment of the invention is directed to an optical combining device. The optical combining device includes polarizing means for reflecting a first optical beam in a first polarization state to a first optical port and for transmitting a second optical beam in a second polarization state orthogonal to the first polarization state from a second optical port to the first optical port. The device also includes reflecting means for reflecting the first optical beam from a third optical port to the polarizing means.

Another embodiment of the invention is directed to an optical fiber system that includes an optical transmitter, an optical receiver; and an optical fiber communications link coupled between the optical transmitter and the optical receiver. At least one of the optical transmitter and the optical fiber communications link including a polarization combiner having first, second and third optical ports. A first optical path is defined between the first and second ports and a second optical path is defined between the first and third ports. A polarizer is disposed on an axis of the polarization combiner, and reflects light on the first path between the first and second ports and transmits light on the second path between the first and third ports. A reflector is disposed between the polarizer and the second port to reflect light between the second port and the polarizer.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
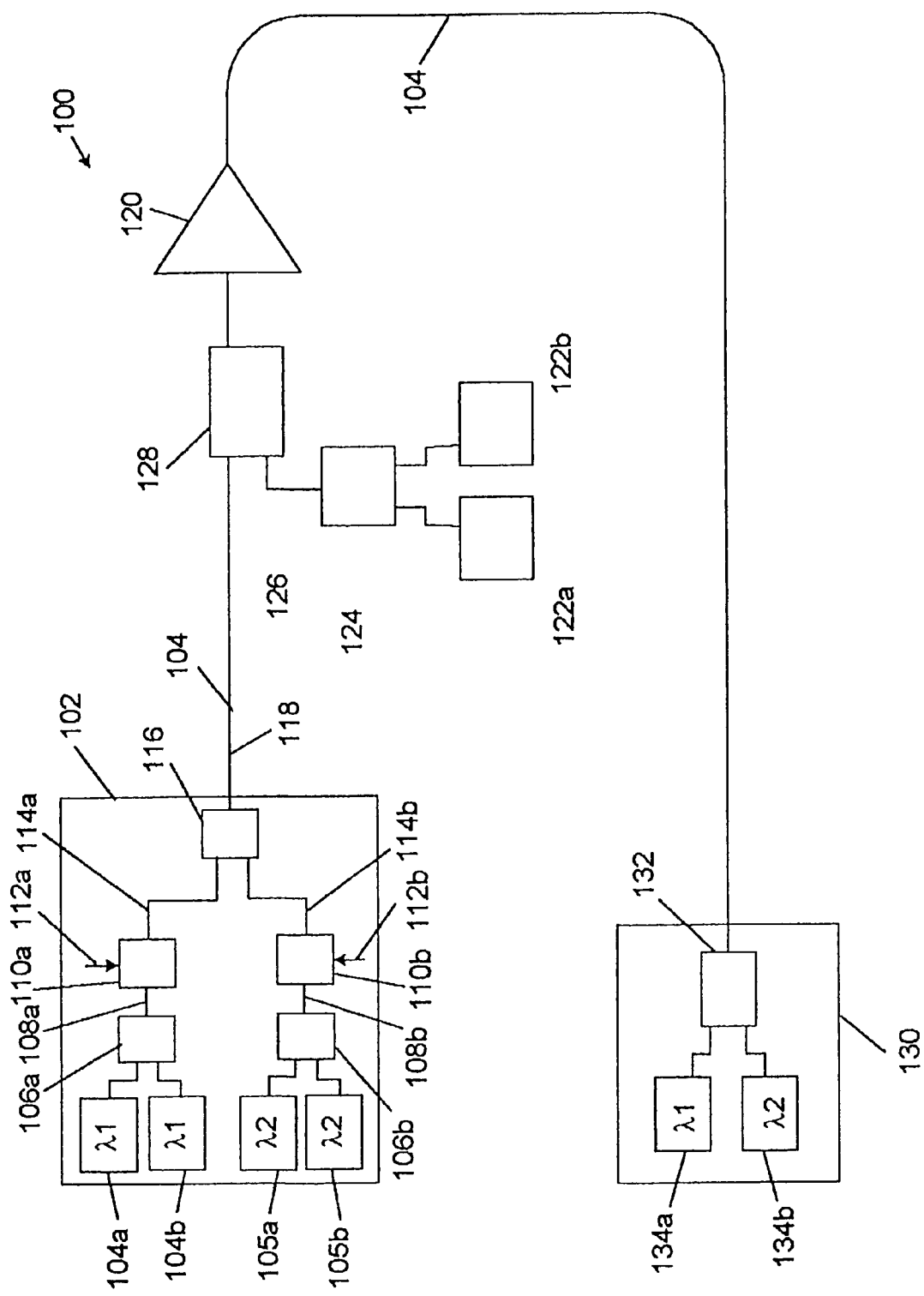
FIG. 1 schematically illustrates an optical communications system incorporating polarization combiners according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In general, the present invention is directed to an in-line method and apparatus for polarization combining light beams. The present invention is believed to be particularly useful for polarization combining the outputs from different lasers in a fiber optics system in order to increase the optical power, for example in combining the outputs from two pump lasers into a single pump beam that is used to pump a fiber amplifier.

One embodiment of a fiber optic communications system 100 is illustrated in FIG. 1, that includes two different examples of polarization beam combining. An optical transmitter 102 includes light sources, typically lasers, operating at one or more wavelengths. The output from the transmitter 102 may be used in a wavelength division multiplexed (WDM) system, where signals at more than one wavelength propagate along a fiber link 104. The transmitter 102 may also be used in a dense WDM (DWDM) communications system, where the signals propagate in closely separated channels of different wavelength. In the illustrated embodiment, the transmitter 102 operates at two different wavelengths, λ1 and λ2. It will be appreciated that the transmitter 102 may operate at a different number of wavelengths.

The transmitter 102 includes at least two light sources 104a and 104b operating at λ1. The outputs from the sources 104a and 104b are polarized and are polarization combined in polarization combiner 106a. The polarization combined output signal 108a has a higher power than is achieved using a single source alone, and so the need for amplification in the fiber link 104 is reduced. The polarization combined output signal 108a may then be modulated in modulator 110a with a first information signal 112a to produce a first optical information signal 114a at λ1.

The transmitter 102 includes at least two light sources 105a and 105b operating at λ2. The outputs from the sources 105a and 105b are polarized and are polarization combined in a second polarization combiner 106b to produce a second polarization combined output signal 108b. The polarization combined output signal 108b may then be modulated in a second modulator 110b with a second information signal 112b to produce a second optical information signal 114b at λ2.

The first and second optical information signals 114a and 114b at different wavelengths λ1 and λ2 are combined in a wavelength division multiplexer (MUX) 116 to produce a multiplexed optical information signal 118 propagating along the fiber link 104.

The fiber link may include one or more fiber amplifiers 120, such as a Raman fiber amplifier or a rare earth-doped fiber amplifier. An example of a commonly used rare earth-doped fiber amplifier is the erbium-doped fiber amplifier. The illustrated embodiment includes only one fiber amplifier 120, but it will be appreciated that more than one fiber amplifier may be used.

The fiber amplifier 120 may be pumped with light from one or more pump lasers. In the illustrated embodiment, the fiber amplifier 120 is pumped with light from two pump lasers P1 122a and P2 122b. The two pump lasers P1 122a and P2 122b may or may not operate at the same wavelength. Output light from the two pump lasers P1 122a and P2 122b is combined in a polarization combiner 124 to produce a combined output beam 126, which is coupled into the fiber 104 via a coupler 128 to pump the amplifier 120.

The optical receiver 130 receives a multiple channel optical information signal from the fiber link 104 and typically demultiplexes the signal before detecting the individual channels. In the illustrated embodiment, the optical receiver 130 receives two channels, but it will be understood that the optical receiver may receive more than two channels. The light from the fiber link 104 is passed into a wavelength division demultiplexer (DMUX) 132 which separates the two channels at wavelengths λ1 and λ2 and directs the individual channels to their respective detectors 134a and 134b.

One particular embodiment of a polarization combiner 200 is now described with reference to FIG. 2. The polarization combiner 200 is preferably housed in an in-line package 202 that contains two fiber collimating units. A dual fiber collimating (DFC) unit 203 includes two fibers 206 and 208 held in a dual-fiber ferrule 204. The ferrule end 204a and the fiber ends 206a and 208a may be polished at a small angle to prevent reflections feeding to other elements. This figure illustrates only the central ray of a pencil of rays, for clarity. It will be understood that some of the beams, for example beam 210 from the first fiber 206, may be diverging or converging or may, like beam 214, be substantially collimated.

Beam 210 from the first fiber 206 diverges towards the lens 211. The lens 211 may be any suitable type of lens, such as a spherical or aspherical lens, having at least one curved refracting surface, or may be a gradient index (GRIN) lens. Beam 214 propagating from the lens 211 is substantially collimated and, since the first fiber 206 is positioned at a distance d1 from the axis 212 of lens 211, beam 214 propagates at an angle θ1 relative to the axis 212.

The collimated beam 214 is incident on a reflective polarizer 216 that has a polarizing surface 217. The polarizing surface 217 reflects light in one polarization state and transmits light in the orthogonal polarization state. Typically, the polarizing surface 217 reflects s-polarized light and transmits p-polarized light, although it may also reflect p-polarized light and transmit s-polarized light. Where the polarizing surface 217 includes a polarizing coating formed from a stack of optical layers, the useful angle of incidence on the polarizing surface 217 for reflection of one polarization state and transmission of another polarization state may be selected depending on the polarizing coating. The polarizing surface 217 may be designed, for example, to operate optimally for an angle of incidence of 45°, or some other angle. Other types of polarizing surfaces may also be used. For example a wire grid polarizer or a microstructured polarizer may form the polarizing surface 217.

Where the beam 214 contains light in a polarization state that is reflected by the polarizer 216, the beam 214 is reflected as beam 218 to a reflector 220. Beam 218 is reflected by the reflector 220 towards the polarizer 216 as beam 222. Beam 222 is then reflected by the polarizer 216 as beam 224 towards the lens 211. The lens 211 directs beam 224 to the fiber 208. Therefore, light passes from the first fiber 206 to the second fiber 208.

A third fiber 232 is held in a second fiber collimating unit 230. The second fiber collimating unit may hold more than one fiber (not shown). The second collimating unit 230 typically includes a ferrule 234 to hold the fiber 232 and a lens 236 to collimate light 238 propagating from the end of the fiber 232 as beam 240. Beam 240 contains light having a polarization that is transmitted by the reflecting polarizer 216. The polarizer 216 may have its entrance face 242 coated with an antireflection coating so as to reduce the reflective losses incurred by beam 240 on passing through the face 242. The beam 240 is aligned so that, upon transmission through the polarizer 216, it passes along the same path as beam 224 from the first fiber 206. Therefore, the light 226 entering the second fiber 208 contains a mixture of light from the two fibers 206 and 232, in orthogonal polarization states.

Where the beams 210 and 238 are substantially purely polarized in orthogonal polarization states, the light in beams 210 and 238 is combined into beam 224 with little or no loss.

Figure 2:
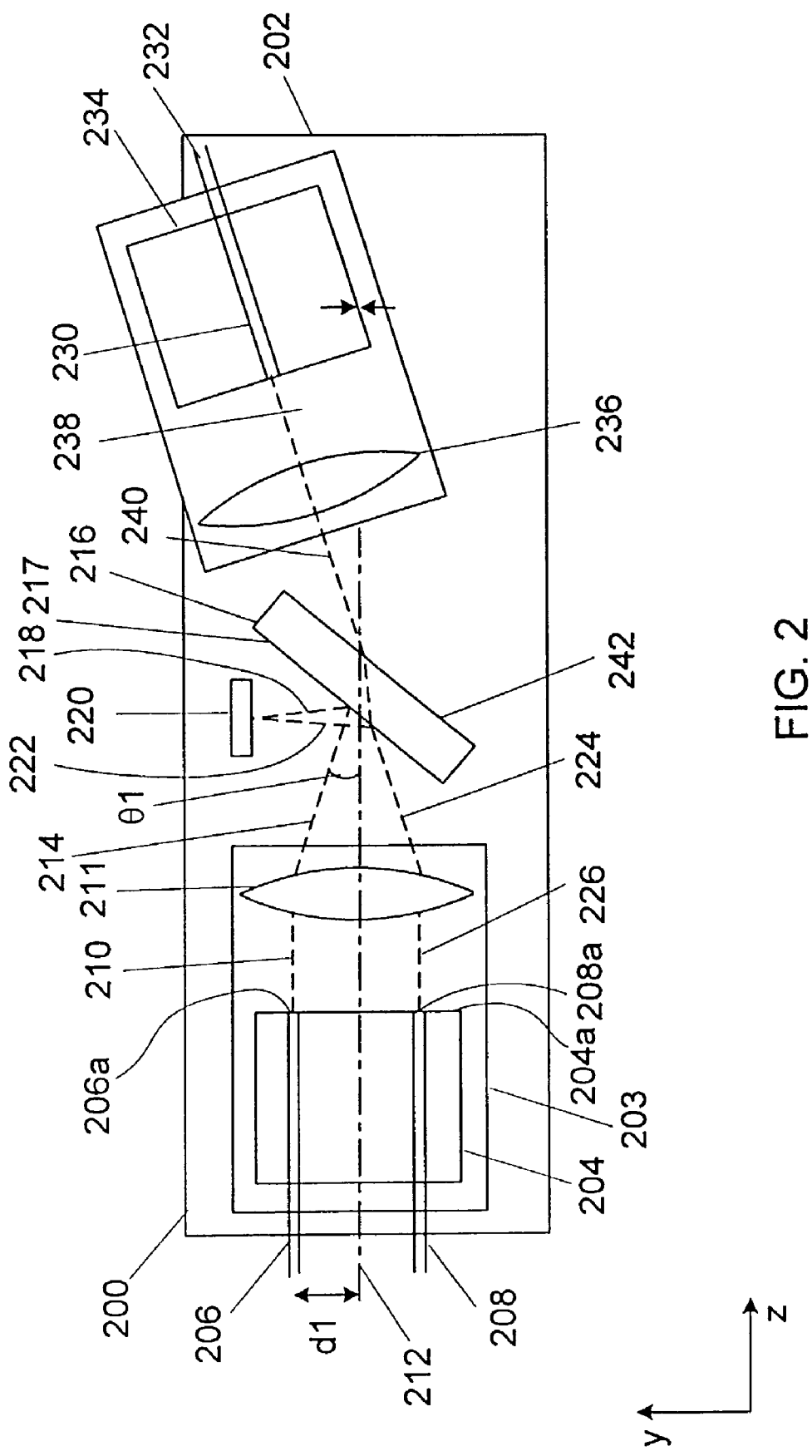
FIG. 2 schematically illustrates an embodiment of a polarization combiner according to the present invention.

In an example of a device as illustrated in FIG. 2, the fibers 206 and 208 have a diameter of around 125 μm and are set in the dual-fiber ferrule 204 at a center-to-center spacing, d1, of 125 μm. The lenses 211 and 236 may be aspherical lenses having a focal length in the range 1.5–2.5 mm. It is to be understood that the values for the various components provided in this paragraph as provided for illustrative purposes only, and are not intended to limit the invention in any way.

The third fiber 232 may be tilted relative to the axis 212, as illustrated, so that the beam 240 propagates at the correct angle relative to the axis so as to combine with the light from the first fiber 206. In another approach, the polarizer 216 may be wedged, so that the polarizing surface 217 is not parallel to the entrance face 242. Refraction by the wedged polarizer 216 may be used to align the light from the third fiber 232 with the light from the first fiber 206.

The fibers 206 and 232 that carry polarized light may be polarization maintaining fibers. For example, if the polarization combiner 200 is used to combine the output from two lasers, the polarized outputs from the two lasers are injected respectively into the first and third fibers 206 and 232, which are oriented so as to introduce the light into the combiner 200 with the polarization direction of the light oriented in directions suitable for combining at the polarizer 216. Optionally, one or more of the fibers 206 and 232 may be polarizing fibers, that transmit light in one polarization state and extinguish light entering the fiber in the other polarization state.

It should be understood that, although the embodiments of polarization combiner 200 are described in terms of combining light of orthogonal polarizations into a single beam of mixed polarization, the combiner may also be used in reverse, to split a beam of mixed polarization into orthogonally polarized beams. This may be achieved by injecting unpolarized light or light of mixed polarization into the combiner 200 through the second fiber 208. Light in one polarization state is transmitted by the polarizer 216 to the third fiber 232 and light in the orthogonal polarization state is reflected to the first fiber 206.

In the following description of additional embodiments of the invention, elements similar to those described above with reference to FIG. 2 have like identification numbers.

Figure 3:
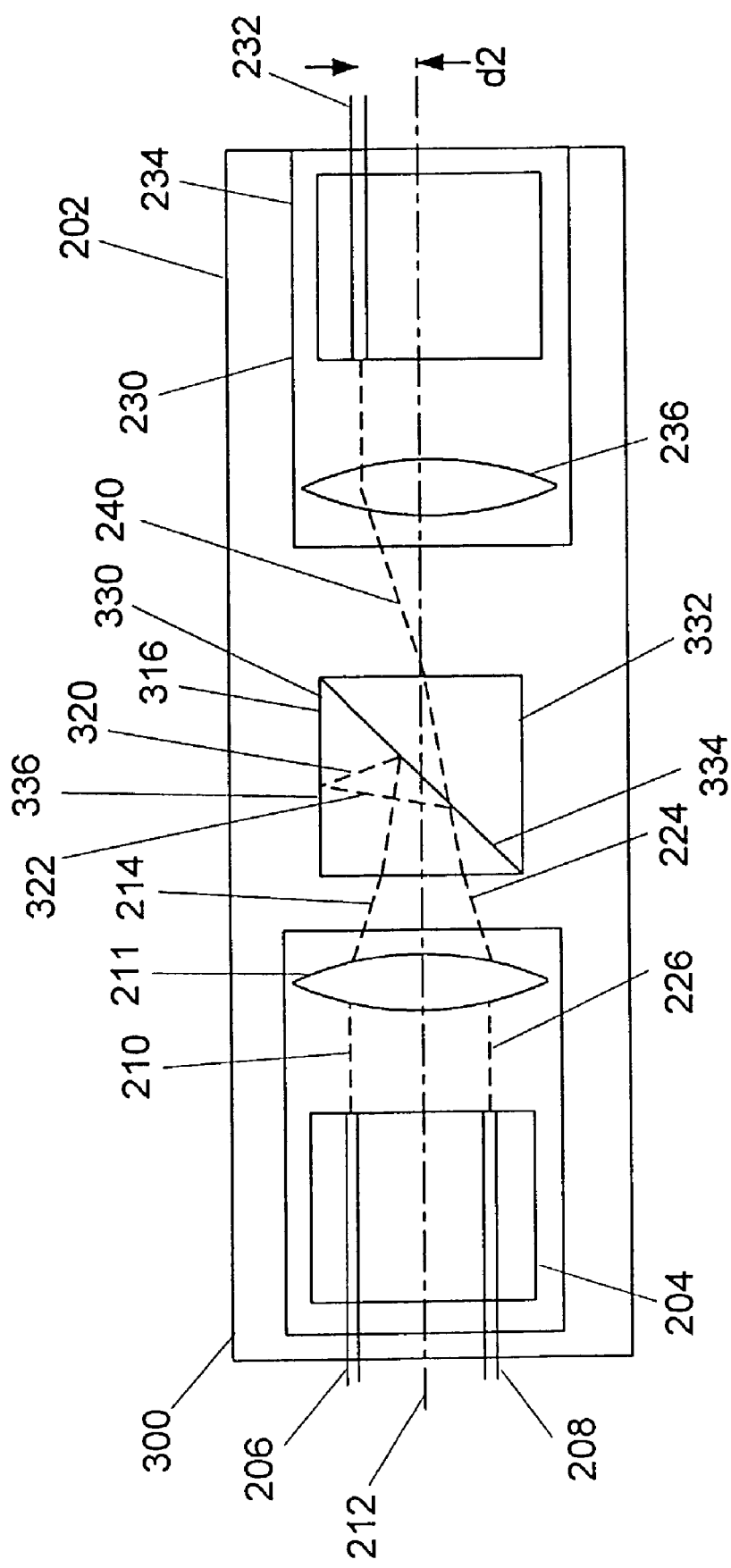
FIG. 3 schematically illustrates another embodiment of a polarization combiner according to the present invention.

Another particular embodiment of a combiner 300 is illustrated in FIG. 3. In this particular embodiment, the reflecting polarizer 316 is provided in the form of a cube polarizer. Despite its name, a cube polarizer need not be in the shape of a cube. Instead, a cube polarizer is formed from two prisms 330 and 332, having a polarizing surface 334 at an interface between the two prisms 330 and 332. Typically, the cube polarizer 316 has two sets of parallel faces, each set at 90° to the other set, so the cube polarizer 316 has a rectangular or square cross-section. The interface between the prisms 330 and 332 may be air-spaced or may be filled with an adhesive or other optically transmitting material.

Collimated light 240 from the third fiber 232 is transmitted through the polarizer 316. Collimated light 214 from the first fiber 206 is reflected at the polarizing surface 334, as beam 320 to a reflector 336 on a side of the prism 330. Beam 320 is reflected by the reflector 336 to the polarizing surface 334 as beam 322. Beam 322 is reflected by the polarizing surface 334 as beam 224 to the third fiber 208.

In this embodiment, the SFC 230 is illustrated to have the third fiber 232 offset from the axis 212 by a distance d2, but substantially parallel to the axis 212. The focal length of the lens 236 and the distance d2 are selected so that the beam 240 enters the polarizer 316 at the correct angle to be coupled to the second fiber 208. This embodiment of SFC may be used with other types of polarizers discussed herein.

Figure 4:
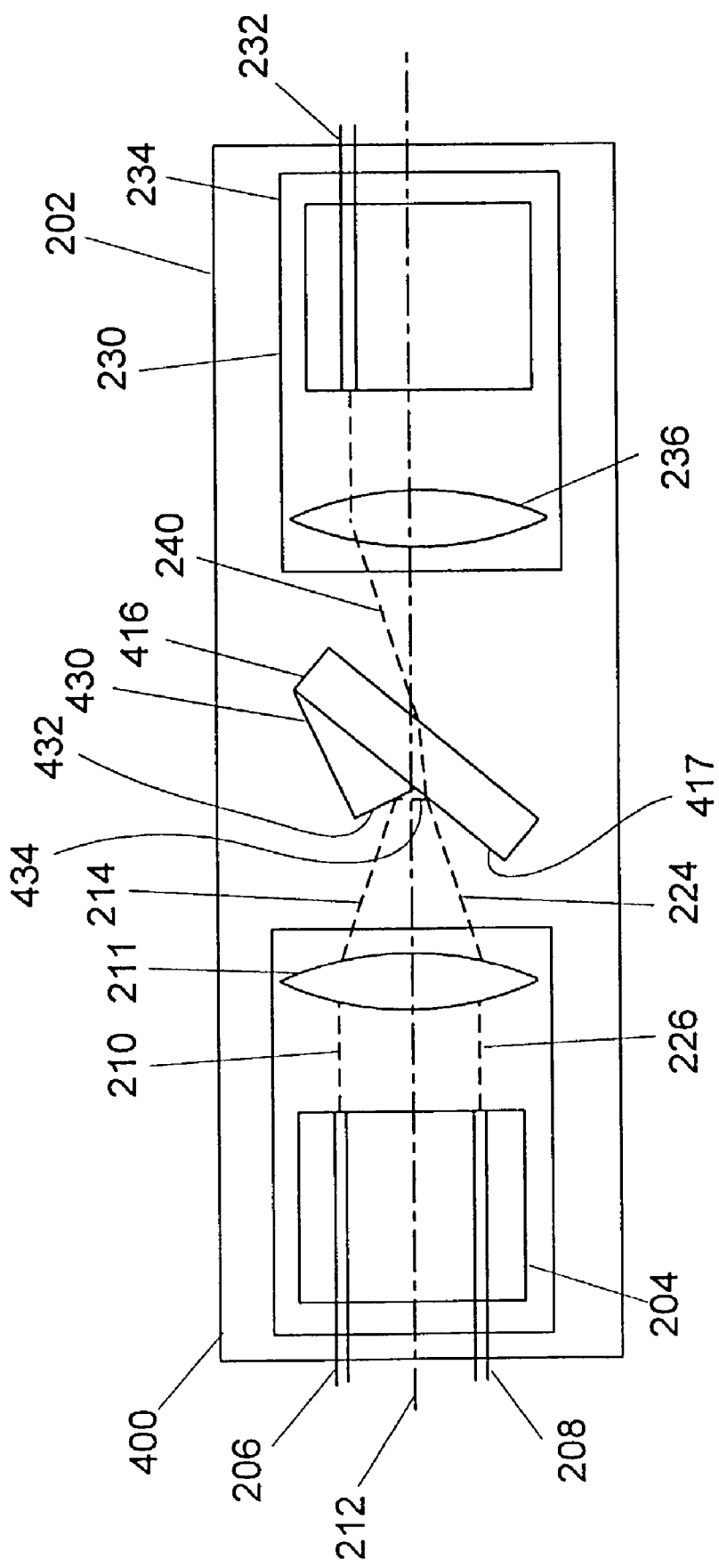
FIG. 4 schematically illustrates another embodiment of a polarization combiner according to the present invention.

Another embodiment of polarization combiner 400 is illustrated in FIG. 4. In this embodiment, the reflecting polarizer 416 is a plate polarizer. A prism 430 is provided with the polarizer 416, and may be attached to the polarizer 416, for example using an optical adhesive, or by optical contacting. The prism 430 has a reflecting surface 432, for example formed by a multilayer dielectric stack of so as to be highly reflective at the wavelength of beam 214. The beam 214 is incident on the reflecting surface 432 and is reflected to the polarizing surface 417 of the polarizer 416 as beam 434. The reflecting surface 432 is provided at an angle to the axis 212 so that the polarizing surface 417 reflects beam 434 along the path of beam 224, so as to combine beam 214 with beam 240.

Figure 5:
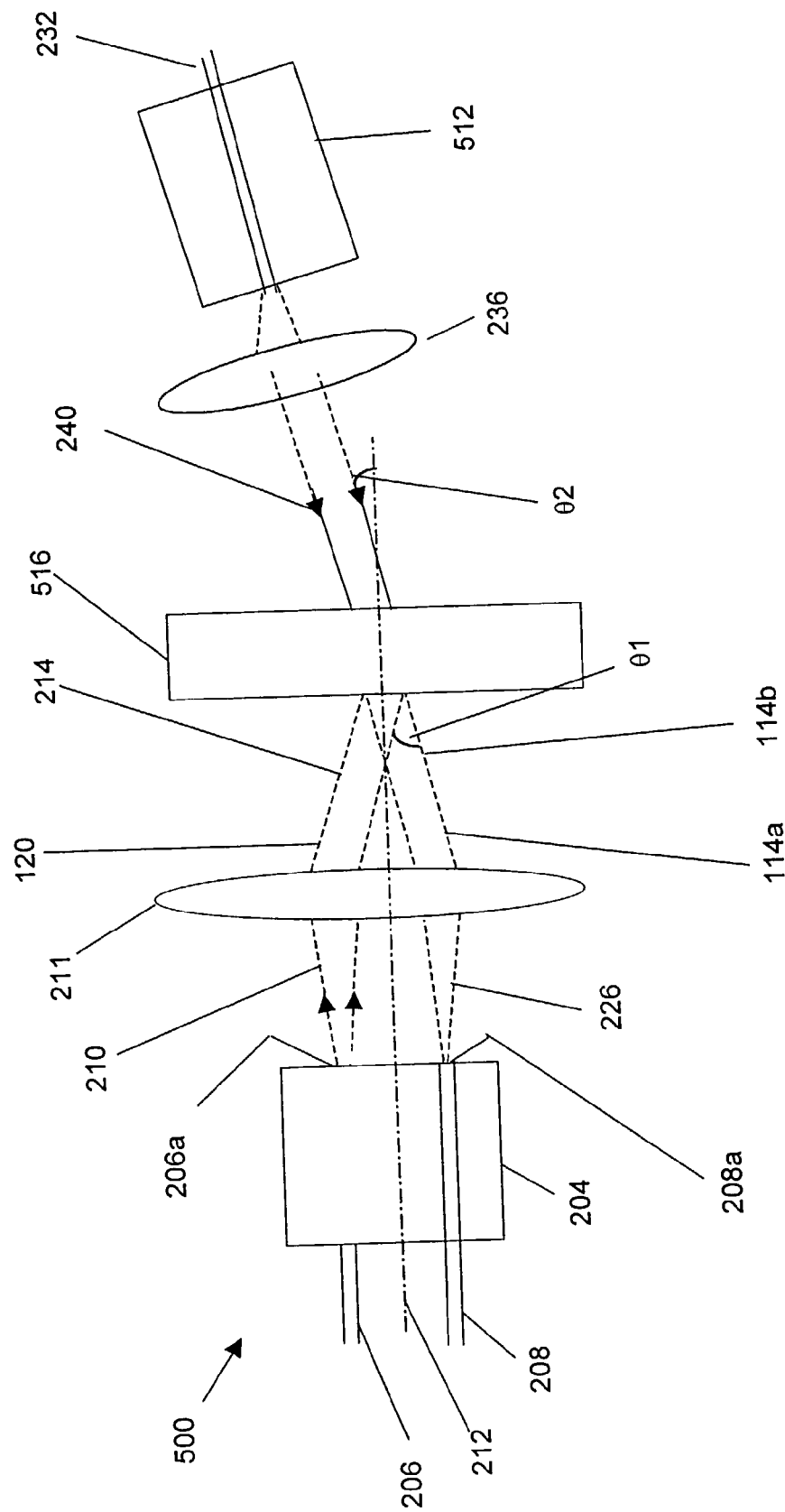
FIG. 5 schematically illustrates another embodiment of a polarization combiner according to the present invention.

Another embodiment of a polarization combiner 500 is illustrated in FIG. 5. Optical fibers 206 and 208 are held in a dual-fiber ferrule 204 as outlined previously. Beam 210 from the first fiber 206 diverges towards lens 211. Beam 214 propagating from lens 211 is substantially collimated and propagates at angle θ1 relative to the axis 212.

The collimated beam 214 is incident on a reflective polarizer 516 that has a polarizing surface 517. The polarizing surface 517 reflects light in one polarization state and transmits light in the orthogonal polarization state. Typically, the polarizing surface 517 reflects s-polarized light and transmits p-polarized light, although it may also reflect p-polarized light and transmit s-polarized light. Where the polarizing surface 517 includes a polarization coating formed from nanostructures, such as microwires, the reflective polarizer may be used at or near normal incidence. This may be referred to as a wire grid polarizer.

Where the beam 214 contains light in a polarization state that is reflected by polarizer 516, the beam 214 is reflected as beam 524. The beam 524 is redirected by lens 211 as beam 526 and focused into fiber 208.

A third fiber 232 is held in ferrule 234. Light 238 emanating from fiber 232 is collimated by lens 236 and exits lens 236 as collimated beam 240. Fiber 232 and lens 236 are centered along optical axis 512, which is offset by angle θ2 relative to optical axis 212. Beam 240 contains light in a polarization state that is transmitted by polarizer 516. The beam 240 is aligned so that, upon transmission through the polarizer 216, it passes along the same path as beam 524 from the first fiber 206. Therefore, the light 526 entering the second fiber 208 contains a mixture of light from the two fibers 206 and 232, in orthogonal polarization states.

Figure 6:
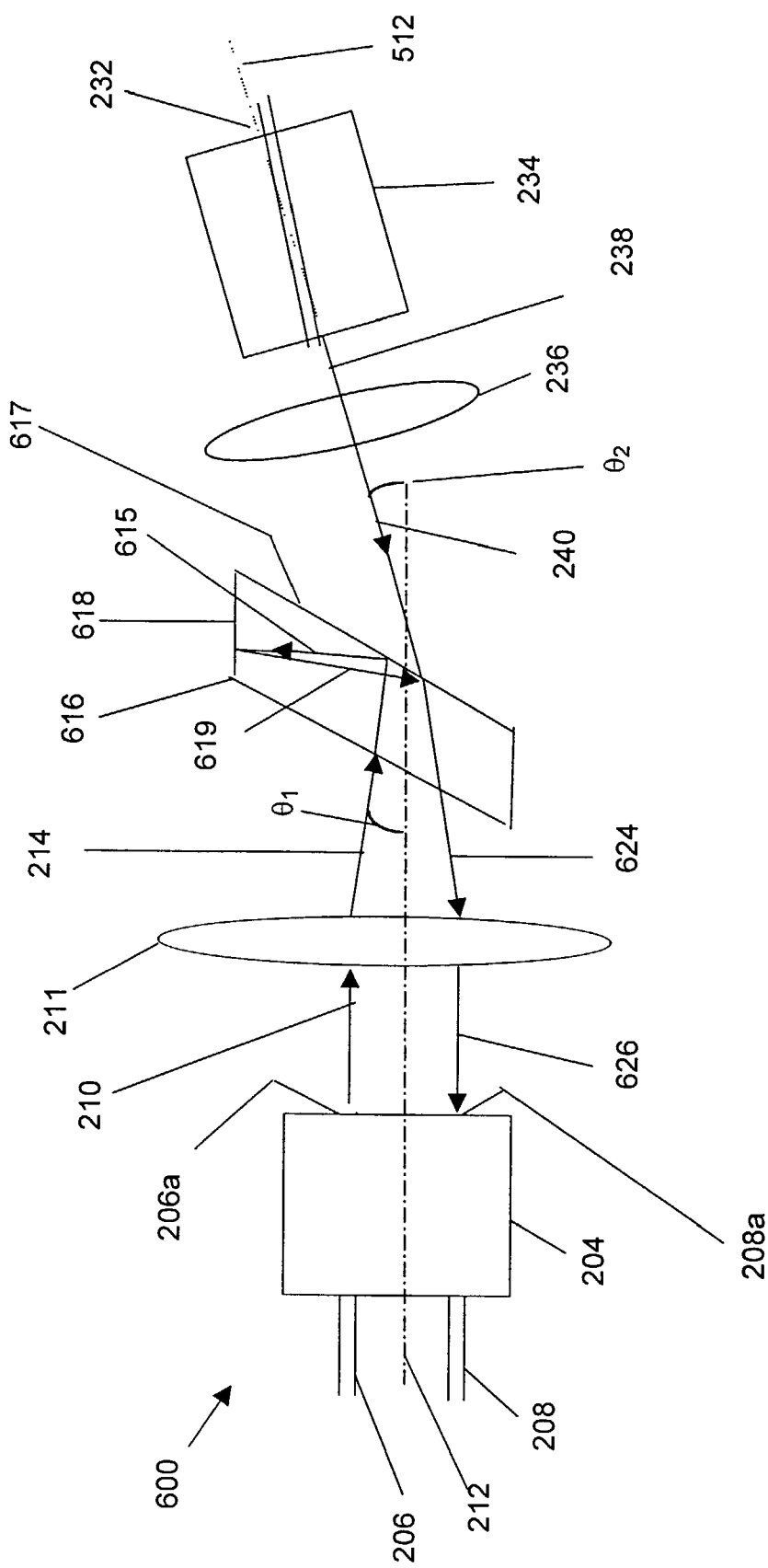
FIG. 6 schematically illustrates another embodiment of a polarization combiner according to the present invention.

Another embodiment of a polarization combiner 600 is illustrated in FIG. 6. Optical fibers 206 and 208 are held in a dual-fiber ferrule 204 as outlined previously. Beam 210 from the first fiber 206 diverges towards lens 211. Beam 214 propagating from lens 211 is substantially collimated and propagates at angle $\theta_1$ relative to the axis 212.

The collimated beam 214 is incident on a reflective polarizer 616 that has a polarizing surface 617. The polarizing surface 617 is oriented near its Brewster angle, therefore polarizing surface 617 reflects light in one polarization state and transmits light in the orthogonal polarization state. Typically, the polarizing surface 617 reflects s-polarized light and transmits p-polarized light, although it may also reflect p-polarized light and transmit s-polarized light. Where the beam 214 contains light in a polarization state that is reflected by polarization surface 617, the beam is reflected as beam 615. The beam 615 is reflected by reflective surface 618 as beam 619 without a change in polarization. Therefore, beam 619 is in the correct polarization state to be reflected by polarization surface 617 as beam 624. Beam 624 is redirected by lens 211 and focused into fiber 208.

A third fiber 232 is held in ferrule 234. Light 238 emanating from fiber 232 is collimated by lens 236 and exits lens 236 as collimated beam 240. Fiber 232 and lens 236 are centered along optical axis 512, which is offset by angle $\theta 2$ relative to optical axis 212. Beam 240 contains light in a polarization state that is transmitted by polarizer 616. The beam 240 is aligned so that, upon transmission through the polarizer 616, it passes along the same path as beam 624 from the first fiber 206. Therefore, the light 626 entering the second fiber 208 contains a mixture of light from the two fibers 206 and 232, in orthogonal polarization states.

Another advantage of the embodiments of polarization combiners discussed above is that it may be possible to dynamically adjust the fiber axes while the system is partially assembled, as opposed to adjusting the fiber axes mechanically to a fiber ferrule before the system is assembled.

One approach to aligning the polarization of the light from the fibers incident on the polarizer is to use a polarization rotator, such as is described in U.S. patent application Ser. No. 10/137,844 filed on the same day as the present application by R. Gerber and S. Gangopadhay as POLARIZATION CONTROLLING OPTICS IN FIBER COLLIMATOR ASSEMBLIES, and which is incorporated herein by reference.

As noted above, the present invention is applicable to polarization combiners and is believed to be particularly useful for combining the polarization of two light sources in fiber optic communications systems, although the combiner may be used in other applications also. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. A passive optical device, comprising:
   first and second ports at a first end of an in-line optical fiber package;
   a third port at a second end of the in-line package opposite the first end and opposing the first and second ports, a first polarization-dependent optical path being defined between the first and second ports for light in a first polarization state and a second polarization-dependent path being defined between the first and third ports for light in a second polarization state orthogonal to the first polarization state;
   a polarizer disposed between the first and second ends of the in-line package on an axis of the in-line package to reflect light in the first polarization state and transmit light in the second polarization state; and
   a reflecting surface disposed on the first path between the polarizer and one of the first and second ports, the reflecting surface being disposed to direct light received from the polarizer in a direction away from the polarizer;
   wherein, when light comprising components in the first and second polarization states enters the device at the first port, the component in the first polarization state is directed to the second port while the component in the second polarization state is directed to the third port.

2. A device as recited in claim 1, wherein the polarizer is a plate polarizer.

3. A device as recited in claim 1, wherein the polarizer is a cube polarizer.

4. A device as recited in claim 1, wherein the polarizer is a microstructured polarization beamsplitter.

5. A device as recited in claim 1, wherein the first optical path, in a direction from the second port to the first port, includes a reflection of light from the second port by the reflecting surface to the polarizer, and a reflection from the polarizer to the first port.

6. A device as recited in claim 1, wherein the reflecting surface is set at an angle to the axis of the in-line package substantially equal in magnitude to an angle between the axis of the in-line package and the polarizing surface.

7. A device as recited in claim 1, wherein the first and second ports are formed by respective ends of first and second fibers in a dual fiber collimating unit, the dual fiber collimating unit including the first and second fibers disposed parallel to an axis of the in-line package and a focusing/collimating lens common to the first and second fibers.

8. A device as recited in claim 7, wherein at least the second fiber is a polarization maintaining fiber.

9. A device as recited in claim 1, further comprising a single lens unit disposed to collimate light emerging from the second port along the first optical path and to focus light passing along the first optical path to the first port.

10. A device as recited in claim 9, wherein the single lens unit defines an optical axis and the first and second ports are positioned off the optical axis.

11. An optical fiber system, comprising:
    an optical transmitter;
    an optical receiver; and
    an optical fiber communications link coupled between the optical transmitter and the optical receiver, at least one of the optical transmitter and the optical fiber communications link including a polarization combiner having first and second optical ports at a first end of an in-line optical fiber package, and a third port at a second end of the in-line package opposite the first end and opposing the first and second ports, a first optical path being defined between the first and second ports and a second optical path being defined between the first and third ports,
    a polarizer disposed on an axis of the polarization combiner, the polarizer reflecting light on the first path between the first and second ports and transmitting light on the second path between the first and third ports; and a reflector disposed between the polarizer and the second port to reflect light between the second port and the polarizer, the reflector being disposed to direct light received from the polarizer in a direction away from the polarizer;

wherein, when light comprising components in first and second polarization states enters the device at the first port, the component in the first polarization state is directed to the second port while the component in the second polarization state is directed to the third port.

12. A system as recited in claim 11, wherein the optical fiber communications link includes at least one fiber amplifier pumped by a pump laser unit, the pump laser unit including at least first and second pump lasers, light from the first pump laser being coupled to the second optical port and light from the second pump laser being coupled to the third port, an output from the first port carrying pump light from the first and second pump laser and coupled to the fiber amplifier.

13. A system as recited in claim 11, wherein the optical transmitter is a multiple channel transmitter, including a plurality of light sources generating light at a plurality of wavelengths, modulators disposed to modulate the light at the plurality of wavelengths with information, and multiplexing devices disposed to multiplex the light at the plurality of wavelengths to produce a single, multiple channel output coupled to the fiber communications link.

14. A system as recited in claim 11, wherein the optical receiver is a multiple channel receiver, including optical demultiplexing devices to separate wavelengths of a multiple channel signal received from the optical fiber communications link and detectors disposed to detect information in individual channels.

15. A device as recited in claim 1, wherein the first optical path includes no more than one reflection from the polarization.

16. A system as recited in claim 11, further comprising a common lens unit disposed to couple light to and from the first and second optical ports.

* * * * *